United States Patent [19]

Tsunefuji

[11] Patent Number: 5,719,621
[45] Date of Patent: Feb. 17, 1998

[54] FILM IMAGE REPRODUCING APPARATUS

[75] Inventor: Katsuhiko Tsunefuji, Sagamihara, Japan

[73] Assignee: Olympus Optical Co., Ltd., Toky, Japan

[21] Appl. No.: 600,477

[22] Filed: Feb. 13, 1996

Related U.S. Application Data

[63] Continuation of Ser. No. 448,919, May 25, 1995, abandoned, which is a continuation of Ser. No. 100,971, Aug. 3, 1993, abandoned.

[30] Foreign Application Priority Data

Aug. 10, 1992 [JP] Japan ................... 4-212629

[51] Int. Cl.$^6$ .................... H04N 5/253; H04N 9/47; H04N 3/40
[52] U.S. Cl. ........................ 348/96; 348/103
[58] Field of Search ........................ 348/96, 112

[56] References Cited

U.S. PATENT DOCUMENTS

| | | | |
|---|---|---|---|
| 4,482,924 | 11/1984 | Brownstein | 358/302 |
| 4,538,176 | 8/1985 | Nakajima et al. | 348/96 |
| 4,807,039 | 2/1989 | Fenton | 348/97 |
| 4,972,267 | 11/1990 | Kaneko et al. | 358/313.22 |
| 4,974,096 | 11/1990 | Wash | 358/302 |
| 5,289,280 | 2/1994 | Nomura et al. | 348/96 |
| 5,293,242 | 3/1994 | Mamiya | 348/362 |
| 5,309,242 | 5/1994 | Asami et al. | 348/97 |

FOREIGN PATENT DOCUMENTS

| | | | |
|---|---|---|---|
| 2-272538 | 11/1990 | Japan | G03C 3/00 |
| 2-293742 | 12/1990 | Japan | G03C 3/00 |
| 2174568 | 5/1986 | United Kingdom | H04N 1/387 |

*Primary Examiner*—Leo Boudreau
*Assistant Examiner*—Bipin Shalwala
*Attorney, Agent, or Firm*—Frishauf, Holtz, Goodman, Langer & Chick, P.C.

[57] ABSTRACT

A film image reproducing apparatus comprises a chamber which receives a film cartridge holding a film with a magnetic recording section. A frame position detector detects a position of a frame of the film with the magnetic recording section in which an image formation is finished. The film with the magnetic recording section is transferred from the cartridge, which cartridge is in the chamber, and film transfer is stopped based on an output of the frame position detector. A reader reads recording data from the magnetic recording section while the film is being transferred. A projector projects light on the film while the film is stopped. A photoelectric converter converts a projection image of the film projected by the projector into an electrical signal. A synthesized image is reproduced from an output of the reader and from an output of the photoelectric converter.

83 Claims, 5 Drawing Sheets

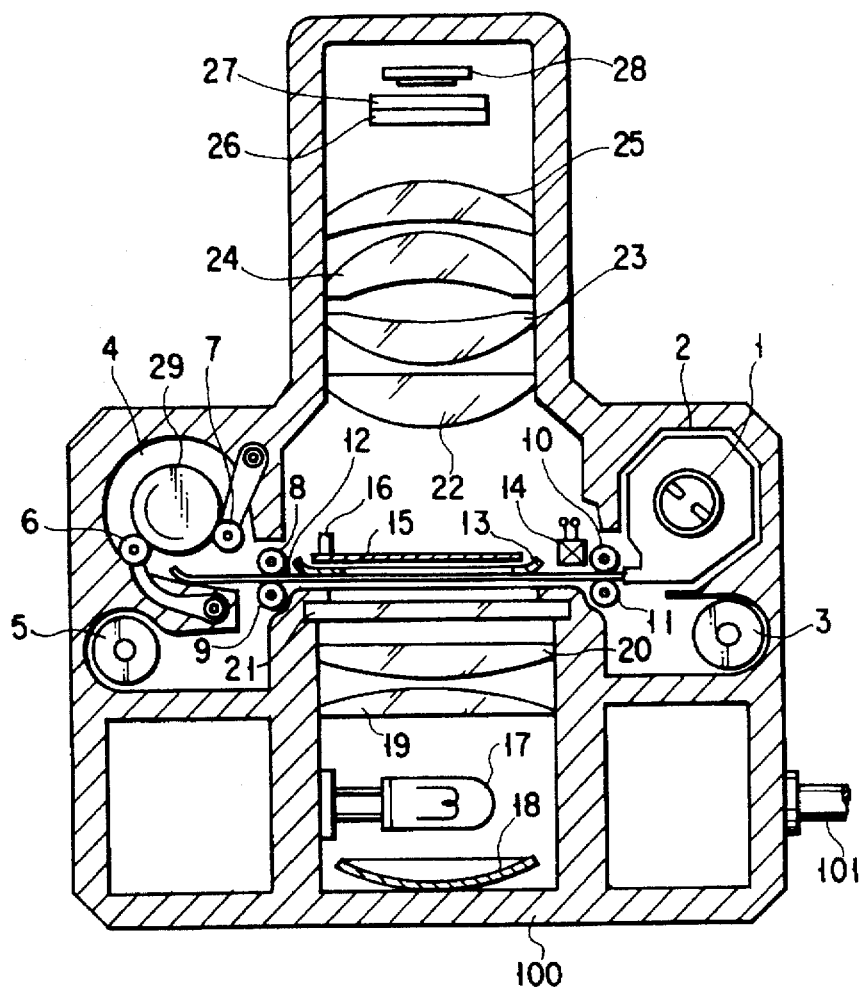
F I G. 1
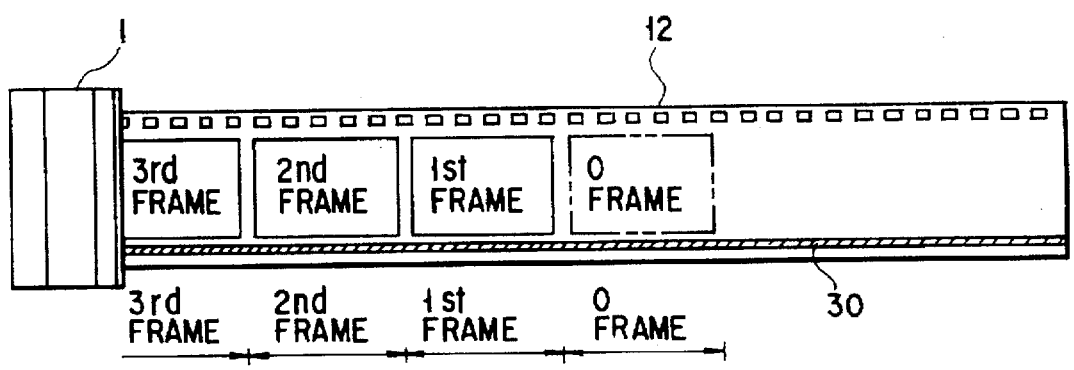
F I G. 2

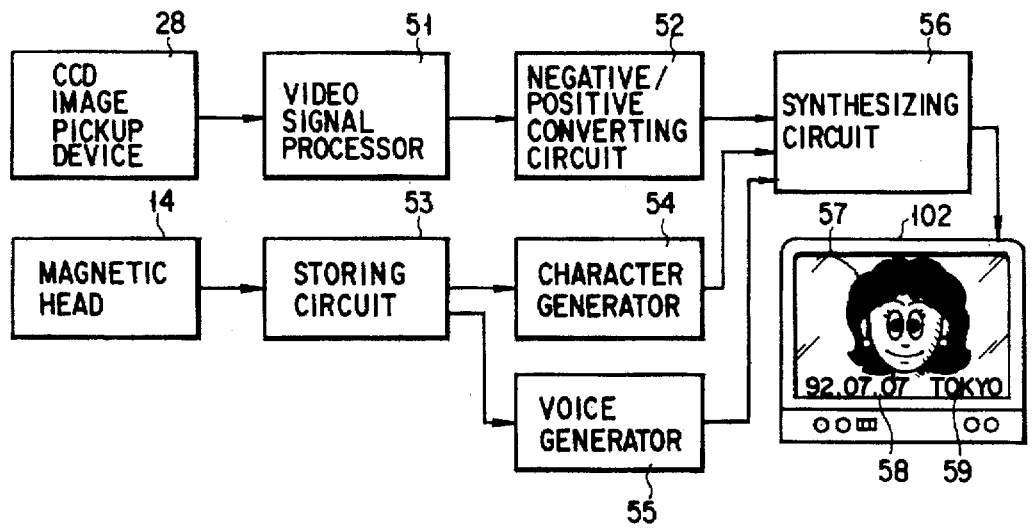
F I G. 4
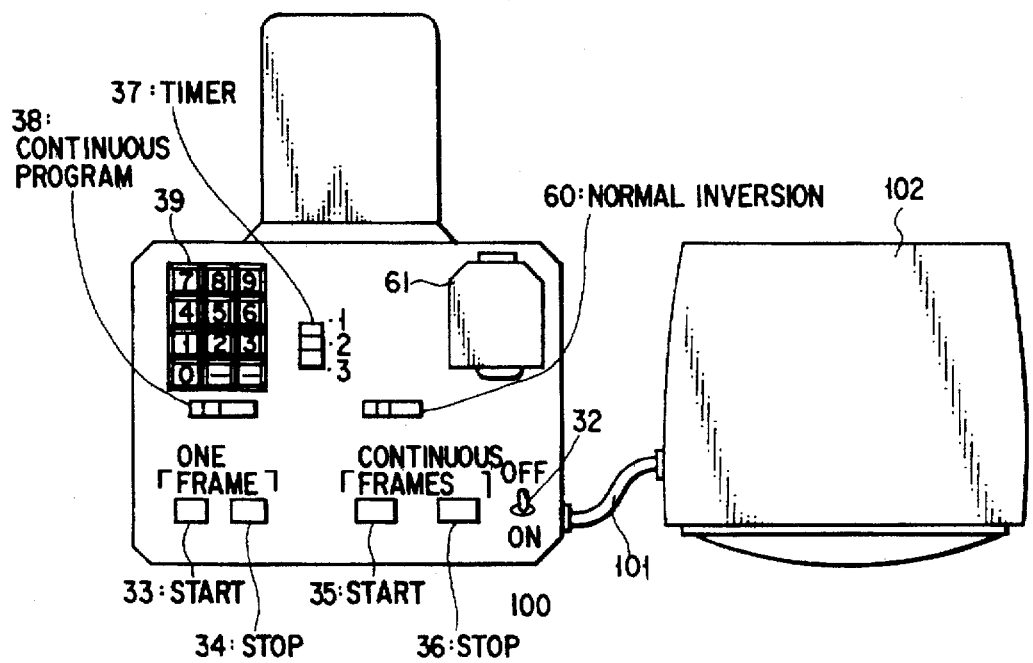
F I G. 5

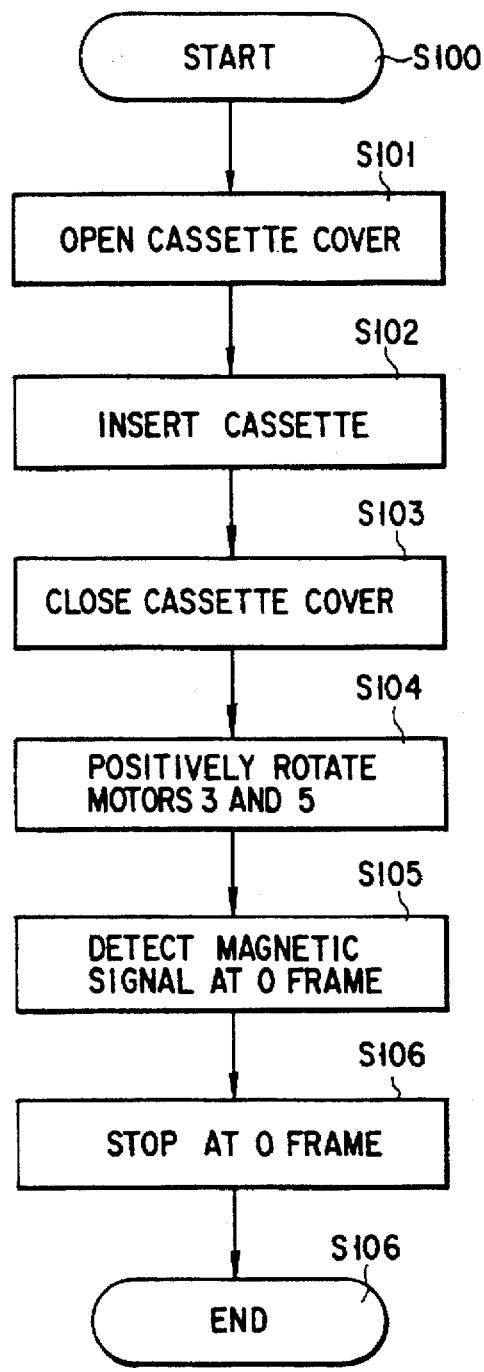
F I G. 6
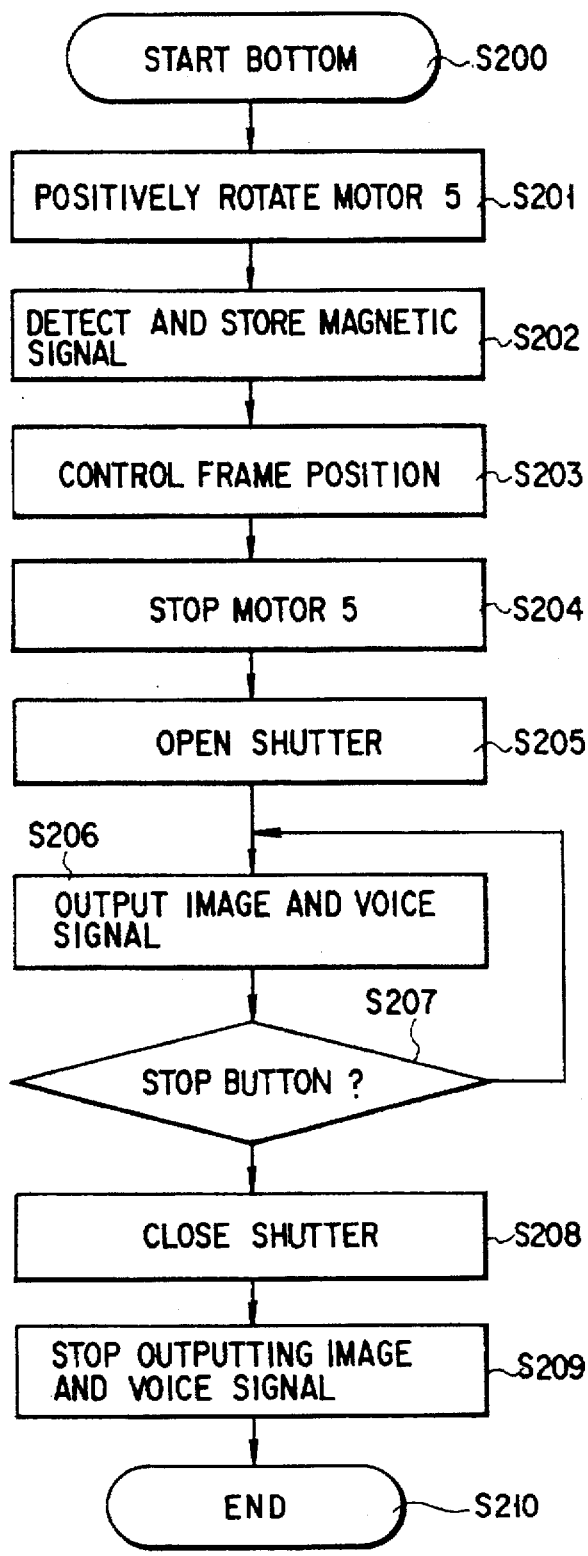
F I G. 7

FILM IMAGE REPRODUCING APPARATUS

This application is a Continuation of application Ser. No. 08/448,919, filed May 25, 1995, now abandoned which is a Continuation of Ser. No. 08/100,971, filed Aug. 3, 1993 (now abandoned).

BACKGROUND OF THE INVENTION

1. Field of the Invention

The present invention relates to a film image reproducing apparatus, which automatically feeds a film stored in a film cartridge case, and reproduces an image formed on the surface of the film.

2. Description of the Related Art

Conventionally, in a slide using a reversal film, the film is projected and stored in a state that a mount is attached. Also, in the slide using a negative film, the film is set into the apparatus such that the frames are taken up six by six from a negative film cover. Then, the negative film is returned to the negative film cover after using the film.

However, in the slide using the reversal film or the negative film, it takes time to set the mount, and the management of the order of the projection is complicated.

SUMMARY OF THE INVENTION

In consideration of the above problems, the present invention has been made and an object of the present invention is to provide a film image reproducing apparatus in which a film can be handled in a state that the film is contained in a cartridge without directly using the film, a film image can be easily reproduced, and the film can be easily stored and managed.

In a film image reproducing apparatus according to a first embodiment of the present invention, a cartridge case winds up a film in which an image formation is finished, and contains the film. Drawing means automatically draws the top end of the film of the cartridge case, and winding means winds up the film, which is drawn by drawing means, around a winding spool. An illumination light source is arranged on a rear surface of the film, and image pickup optical system is arranged on a front surface of the film. Moreover, a photoelectrically converting device receives a formed image, which is guided from the image pickup optical system onto the surface of the film, and photoelectrically converts the image. Then, displaying means displays the formed image of the surface of the film, which is received and photoelectrically converted by photoelectrically converting means, one frame by one frame or continuously. In a film image reproducing apparatus according to a second embodiment of the present invention, displaying means displays data, which is recorded in magnetic recording means of the film. Moreover, in a film image reproducing apparatus according to a third embodiment of the present invention, printing means prints an image of the surface of the film, which is incident upon the photoelectrically converting device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partially cross sectional view of a film image reproducing apparatus of the present invention;

FIG. 2 is a view showing a film cartridge case 1, which is used in the film image reproducing apparatus of the present invention, and a state that a film 12 is fed from the film cartridge case 1;

FIG. 4 is a view showing the structure of a film image reproducing apparatus according to a first embodiment of the present invention;

FIG. 5 is an outside view of the film image reproducing apparatus according to the first embodiment of the present invention;

FIG. 6 is a flow chart for explaining an operation in which the film cartridge case 1 is inserted to a cartridge case chamber 2 to perform an automatic mount of a film 12 according to the first embodiment;

FIG. 7 is a flow chart for explaining an operation when an image formation is performed one frame by one according to the first embodiment of the present invention;

DETAILED DESCRIPTION OF THE PREFERRED EMBODIMENTS

Figure 3:
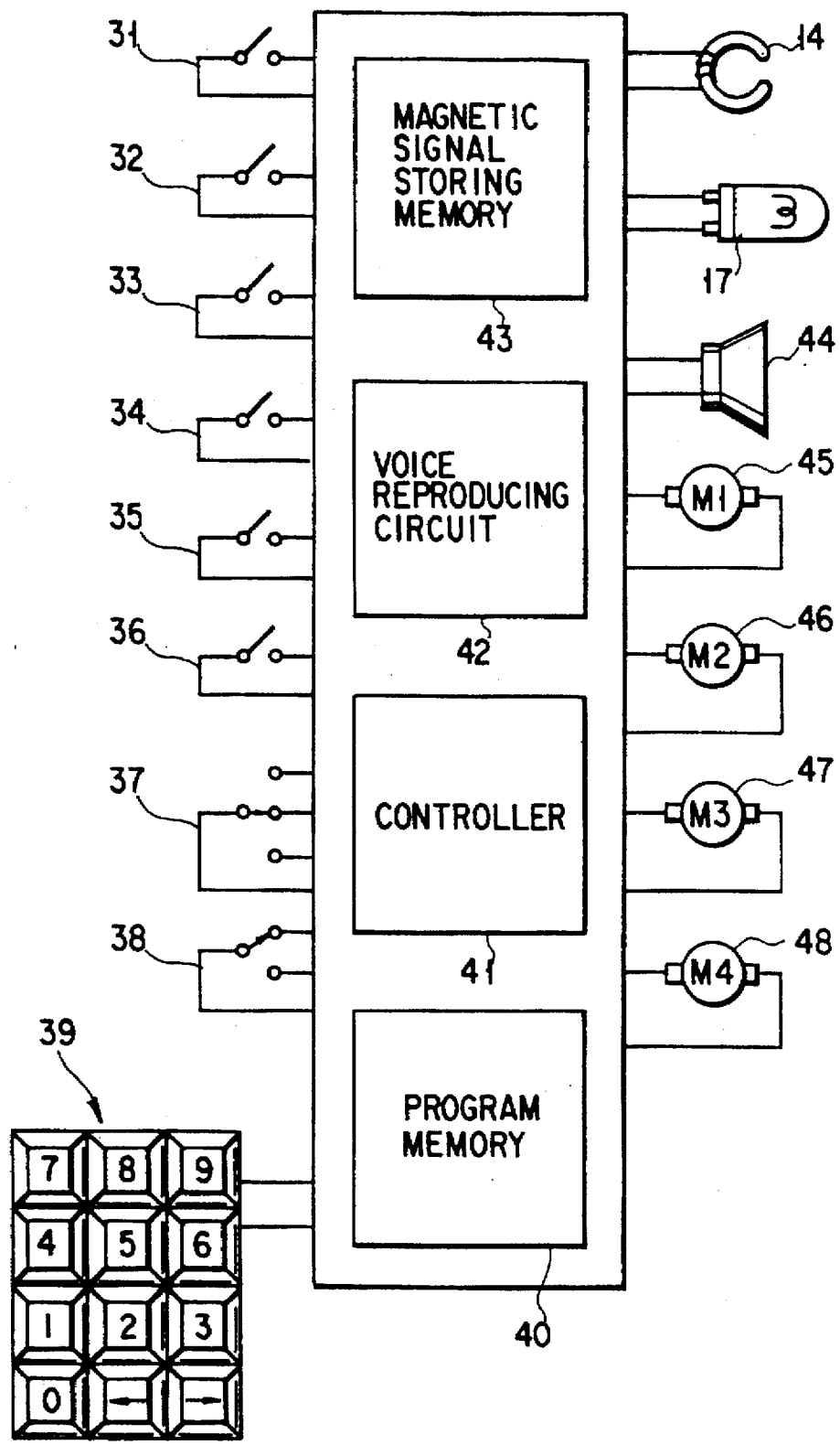
FIG. 3 is a system structural view of the film image reproducing apparatus of the present invention.

Before explaining the embodiments, a film cartridge case 1 to be used in the film image reproducing apparatus of the present invention will be explained in detail.

FIG. 2 is a view showing the film cartridge case 1, and a state that a film 12 is fed from the film cartridge case 1.

As shown in FIG. 2, a magnetic stripe 30 for magnetically recording data is formed in the film 12. In a magnetic stripe 30, formed image data is recorded in the range in accordance with respective frames. Such data is recorded in the magnetic stripe 30 at the time of shooting by a camera. In this case, the explanation of the mechanism is omitted. Normally, a film leader is not projected outside of the cartridge case. The content of data recorded in the magnetic stripe 30 of the film 12 includes e.g., a frame number of projection, a date of the projection, the locations of top and bottom at the time of image-forming vertically and horizontally, and voice data of location of projection. In the drawing, a zero frame is an imaginary frame for setting an initial position, and an actual image formation is performed from a first frame.

Moreover, as a film cartridge, for example, there can be used a "Film Cassette" disclosed in Published Unexamined Japanese Patent Application No. 2-272538 or a "Film Cartridge" disclosed in Published Unexamined Japanese Patent Application No. 2-293742.

The following will explain the film image reproducing apparatus of the present invention using such film cartridge 1.

FIG. 1 is a partially cross sectional view of the film image reproducing apparatus of the present invention.

In FIG. 1, a cartridge case chamber 2 of a main body 100 is a space for receiving a film cartridge case 1. In the vicinity of the cartridge case chamber 2, film feeding rollers 10 and 11 are provided at a predetermined position in a direction where the film is fed when the film cartridge 1 is mounted or received in the chamber 2.

A magnetic head 14 and a pressure plate 13 are provided at positions, which are further ahead of the film feeding rollers 10 and 11 in the film feeding direction. In the vicinity of an entrance of a film winding chamber 4, there are provided film feeding rollers 8 and 9 having the same structure as the film feeding rollers 10 and 11.

Moreover, a spool 29 for winding the film, and automatic winding rollers 6 and 7 for pressing the film 12 to automatically wind rollers 6 and 7 against spool 29 are provided in the film winding or receiving chamber 4. In the vicinity of the cartridge case or receiving chamber 2 and the film winding chamber 4, motors 3 and 5 are respectively provided so as to rotate each spool.

As an optical system for reproducing the formed-image of the film 12, a silver-silver chloride film illumination light source lamp 17 is formed in the rear surface of the film 12. A reflecting mirror 18 is arranged on the optical path of the light source lamp 17. Capacitor lenses 19 and 20 and a diffusion plate 21 are arranged on the optical path of the reflected light due to the reflecting mirror 18.

Then, on the optical path of light passed through the film 12, image pickup optical systems 22 to 25, an infrared cut filter 26, and a low-frequency cut filter 27 are arranged, and an image pickup device 28 is provided on the optical path of light passed through the low-frequency cut filter 27.

According to the above mentioned structure, if the film cartridge case 1 in which the film 12 is already mounted is set into the cartridge case chamber 2, the spool of the cartridge case 1 is rotated by the motor 3, and the film 12 is fed in the direction of the film winding chamber 4 by the film feeding rollers 8 to 11. At this time, the film is prevented from being floated by the pressure plate 13, which is urged in the direction where the film is pressed by a spring.

If the top end of the film 12 reaches the film winding chamber 4, the spool 29, which is on the film winding chamber 4, is rotated by the motor 5, and the film 12 is pressed to the spool 29 by the automatic film winding rollers 6 and 7, which are urged to the spool 29 by springs. Moreover, while the film is feeding, a magnetic signal is detected from the magnetic stripe of the film surface by the magnetic head 14. The magnetic signal, serving as a video signal synthesized by a regenerator to be explained later, is outputted to a monitor (not shown) through a cable 101.

On the other hand, light radiated from the silver-silver chloride film illumination light source lamp 17 is reflected in the direction of the film surface by the reflecting mirror 18. Thereafter, light is radiated on the film surface through capacitor lenses 19 and 20 and the milky diffusion plate 21. The shielding shutter 15 is used to prevent the formed image of an unnecessary frame. The shielding shutter 15 is provided around a shaft 16 to be able to be opened and closed by use of the motor.

Light passed through the film surface passes through the image pickup optical systems 22 to 25, the infrared cut filter 26, and the low-frequency cut filter 27. Then, light is reduced and projected by the image pickup device 28 such as CCD, and an image signal is outputted from the image pickup device 28. Similar to the case of the magnetic signal, the image signal, serving as a video signal synthesized by the regenerator to be explained later, is outputted to the monitor (not shown) through a cable 101.

FIG. 3 is a system structural view of the film image reproducing apparatus of the present invention.

As shown in FIG. 3, the film image reproducing apparatus comprises a ten-key input button section 39, a program memory 40 for reserving a program inputted by the ten-key input button section 39, and a controller 41 for controlling a projection by driving an M4 motor 48 based on a program signal inputted by the program memory 40 or a magnetic signal storing memory 43. A voice regenerator 42 is a circuit for outputting a voice signal, which is detected through the magnetic head 14 from the magnetic stripe 30 of the film 12, to a speaker 44, and the output state of the circuit is controlled by the controller 41.

Moreover, on the upper surface of the main body 100 of the image reproducing apparatus, there are provided start and stop buttons 33 and 34 for one frame film projection and start and stop buttons 35 and 36 for continuous frame film projections, and an ON and OFF switch 32 for lamp 17.

On the other hand, on the side surface of the main body 100 of the image forming reproducing apparatus, there are provided the ten-key input button section 39, a program input changing switch 38, a timer switch 37 for gradually switching the running time for one frame film projection, and a cassette cover (not shown) opening/closing detection switch 31 for detecting the state of the cassette cover when it is closed/opened.

In addition, there are provided M1 and M2 motors 45 and 46, which positively rotate the spool shaft (not shown) to feed out the film 1 with a magnetic band from the film cassette, and an M3 motor 47, which rotates the film housing to control the top and bottom direction of the image, and an M4 motor 48, which drives the opening/closing of the shutter.

FIG. 4 shows the structure of the first embodiment of the present invention in which the film image reproducing apparatus is connected to the monitor.

In FIG. 4, the image pickup device 28 is connected to a video signal processor 51, which is connected to a negative/positive converting circuit 52. The magnetic head 14 is connected to a storing circuit 53, which is connected to a character generator 54 and a voice generator 55. The negative/positive converting circuit 52, the character generator 54 and the voice generator 55 are connected to the synthesizing circuit 56, which is connected to a monitor 102.

According to the above-mentioned structure, the image signal formed by the image pickup device 28 is changed to a video signal, which can be reproduced in the monitor 102, by the video signal processor 51, and converted to a positive image by the negative/positive converting circuit 52 in the case that the negative film is used. Thereafter, the positive image is sent to the synthesizing circuit 56.

On the other hand, the magnetic signal sent from the magnetic head 14 is stored by the storing circuit 53, and read when it is reproduced on the monitor 102. The read signal is converted such that data of date of the film projection and data of location of the film projection are converted to character data by the character generator 54, and sent to the synthesizing circuit 56. The synthesizing circuit 56 synthesizes the film formed image, magnetic recording character data, and magnetic recording voice data, and outputs it as a video signal to the monitor 102. As a result, on the monitor 102, a film formed image 57 is reproduced, and data 58 and 59 recorded in the magnetic stripe 30 are reproduced. The voice is reproduced by a built-in speaker (not shown).

FIG. 5 is an outside view of the first embodiment of the present invention.

In FIG. 5, if the switch 32 of the cartridge case chamber is turned on, the lamp is turned on, and the circuits are operated. In the figure, reference numerals 33 to 36 are start and stop buttons for one frame film projection and continuous frame projection, and reference numeral 37 is the timer switch for gradually switching the running time for one frame film projection. By use of the timer 37, time setting of three steps can be performed.

Moreover, the ten-key input button section 39 is used to designate an arbitrary frame in order of the frame film projection at the time of the continuous frame film projection. Then, if the switch 38 is set to the program to start the continuous film projection, the formed image, magnetic data are image-formed in the order sequence of the programmed frame. A switch 60 is a negative/positive changing switch for changing a negative film image to a positive image.

The following will explain an operation of the first embodiment, which is from the insertion of the film cartridge case 1 to the cartridge case chamber 2 till the automatic mount of the film 12, with reference to the flow chart of FIG. 6.

If a cassette cover 61 (FIG. 5) is opened, the cartridge case 1 is inserted into (i.e., dropped in as seen in FIG. 1) to the cartridge case chamber 2, and the cover 61 is closed, the motors 3 and 5 are positively rotated, and a film leader is fed from the cartridge case 1 by the motor 3. The film leader is passed through the rollers 10 and 11, the pressure plate 13, and the rollers 8 and 9, and reaches the film winding chamber 4.

Figure 8:
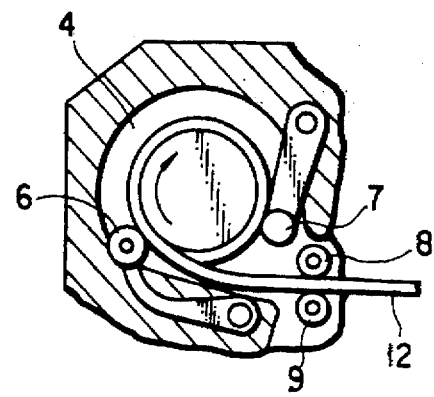
FIG. 8 is a view showing a state that the film 12 is strongly tightened by a spool 29.

When the film leader is fed out, the film leader is pressed to the spool 29 by the rollers 6 and 7, and is tightly wound around the spool shaft as shown in FIG. 8. If the film leader is set in the state shown in FIG. 8, the film winding can be performed by only the motor 5 without feeding the film due to the motor 3 (Steps S101 to S104).

Then, the 0 frame position is read from the magnetic stripe 30 by the magnetic head 14 while the film is feeding (step S105). The film 12 is stopped at the position of the 0 frame (step S106). Then, the automatic mount of the film 12 is ended (step S107).

The following will explain an operation in which the film projection is performed by one frame by one frame according to the first embodiment with reference to the flow chart of FIG. 7.

If the start button 33 for one frame is pressed (step S200), the motor 5 is positively rotated, and the film is wound up by one frame. At this time, data of such as the frame number, the date of the film projection, the location of the film projection, and the voice signal are detected from the magnetic signal by the magnetic head 14 and these data are stored (steps S201 and 202). If the feeding of one frame is ended, the motor 5 is stopped (steps S203 and 204).

Sequentially, the shutter 15 is opened to start the film projection, and character data and the voice signal are generated from the magnetic signal, synthesized with the image signal, and reproduced in the monitor 102 (steps S205 and S206). Then, if the stop button 34 is pressed, the shutter is closed and the reproduction is stopped (steps S207 to 209).

At the time of the continuous reproduction, the same operation as the above is repeated. In other words, the operation of the reproduction is repeated at a time interval set by the timer, which sets the reproduction time for one frame. Also, at the time of the program continuous reproduction, it is necessary to feed the film 12 since the order of the reproduction frame is irregular. At this time, the motor of FIG. 2 is reversely rotated to reversely run the film 12.

Then, if all reproduction is finished, the motor 3 is reversely rotated such that the film 12 is contained in the film cartridge case 1, and the operation is stopped (step S210).

Next, a second embodiment will be explained in which a thermal printer of thermally sublimated coloring matter transferring type is connected to a film data reproducing apparatus of the present invention.

Figure 9:
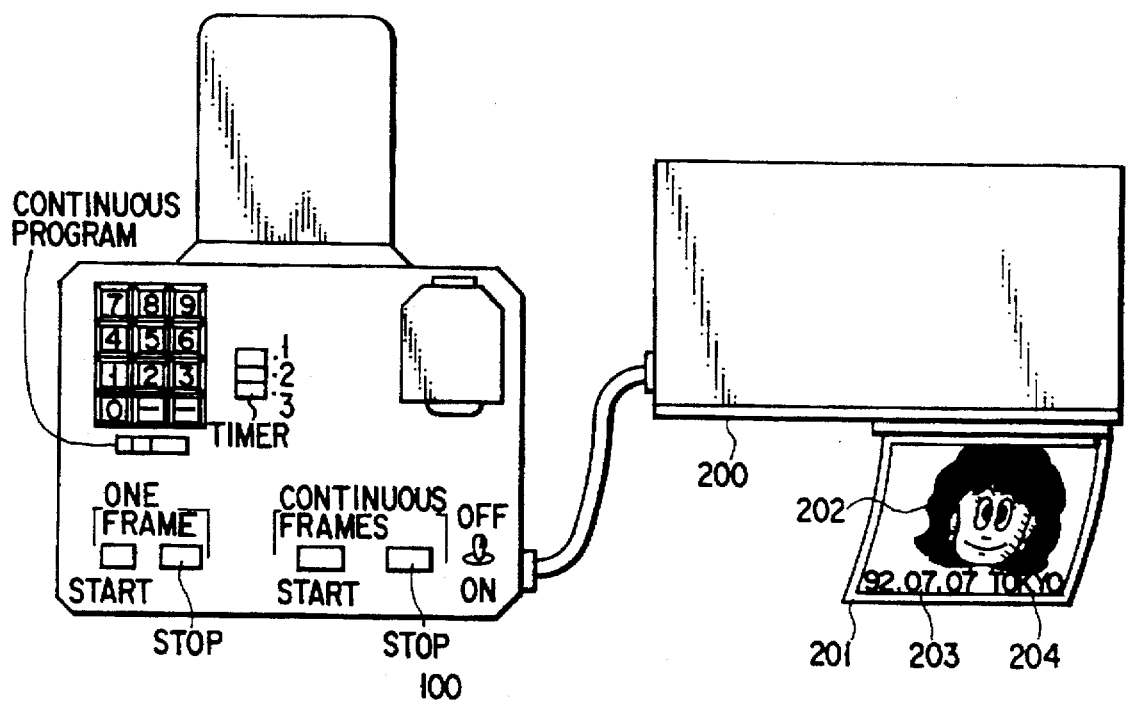
FIG. 9 is a view showing the structure of a film image reproducing apparatus according to a second embodiment of the present invention.

FIG. 9 is a view showing the structure of the second embodiment of the present invention. As shown in FIG. 9, this embodiment is characterized in that the thermal printer 200 of thermally sublimated coloring matter transferring type prints data 203 and 204, which are recorded in a film image 202 reproduced from the film surface and the magnetic stripe 30 and which are synthesized, on a print paper 201. Since the other structure is the same as the first embodiment, the explanation is omitted.

Figure 10:
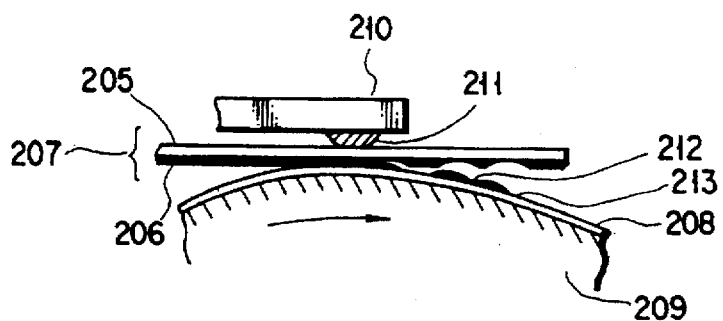
FIG. 10 is a view for explaining a principle of a thermal transferring method of a thermal printer of thermally sublimated coloring matter transferring type.

The following will explain the specific thermal transferring method of the thermal printer of thermally sublimated coloring matter transferring type with reference to FIG. 10.

As shown in FIG. 10, an ink ribbon 207, which is formed by coating a base film 205 with an ink layer 206 in which a coloring matter having a sublimation property is dissolved in a binder resin, and a recording paper 208, which is wound around a drum 209, are overlayed on each other. Moreover, a heating element 211 of a thermal head 210 is heated from the rear surface of the ribbon. As a result, ink is transferred to the recording paper from the ribbon as shown by portions 212 and 213. Then, the amount of heat is controlled by electric energy to be applied to the thermal head, and concentration of print can be changed by printing the film image on the recording paper. Also, if the applied-energy is controlled by the video signal, the image of, e.g., silver-silver chloride film can be printed.

As mentioned above, according to the film image reproducing apparatus of the present invention, the silver-silver chloride film, which is contained in the film cartridge case in advance, is automatically fed to be loaded, and the formed image of the film and the magnetic recording are converted to a video signal to be reproduced in various types of mediums.

Therefore, by only inserting (i.e., dropping in) the film cartridge case into the open chamber of the film image reproducing apparatus, an arbitrary frame can be easily reproduced on the monitor and the film image can be printed.

According to the present invention, there can be provided a film image reproducing apparatus in which a film can be handled in a state that the film is contained in a cartridge without directly using the film, a film image can be easily reproduced, and the film can be easily stored and managed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A film image reproducing apparatus using a film with a magnetic recording section which stores voice data thereon, the film with the magnetic recording section being contained in a cartridge, the image reproducing apparatus comprising:

a container for containing a cartridge holding a developed film with the magnetic recording section therein, said chamber being arranged to receive the cartridge therein through an opening in the container in a drop-in manner;

frame position detecting means for detecting a position of a frame of said film with the magnetic recording section in which an image formation is finished;

film transferring means for automatically supplying and transferring said film with the magnetic recording section from the cartridge contained in said chamber around a winding spool, and for stopping the film transfer based on an output of said frame position detecting means at an arbitrary desired frame;

data reading means for reading recorded data from said magnetic recording section while said film is being transferred by said film transferring means;

projecting means for projecting light on said film while said film is stopped by said film transferring means;

photoelectric converting means for converting a projection image of said film projected by said projecting means to an electric signal;

image reproducing means for reproducing a synthesized image from an output of said data reading means and from an output of said photoelectric converting means;

displaying means for displaying said synthesized image in a programmed sequence based on an output of said image reproducing means; and means for audibly reproducing said voice data stored on said film simultaneously with reproduction and display of said synthesized image.

2. The apparatus according to claim 1, further comprising printing means for printing said synthesized image based on the output of said image reproducing means.

3. The apparatus according to claim 2, wherein said printing means is a thermal printer of thermally sublimated coloring matter transferring type.

4. The apparatus according to claim 1, wherein said data reading means has storing means for storing said read data.

5. The apparatus according to claim 1, wherein said photoelectric converting means has an image pickup circuit and a compensating circuit for compensating for an output of the said image pickup circuit in accordance with the types of films.

6. The apparatus according to claim 1, further comprising interrupting means for interrupting the projection light projected by said projection means at least during the transfer of said film.

7. The apparatus according to claim 1, further comprising a first mode for continuously reproducing an image of one frame until a predetermined signal is inputted, and a second mode for continuously reproducing images of a plurality of frames at an interval of a predetermined time.

8. The apparatus according to claim 7, wherein said interval of said predetermined time can be arbitrarily set.

9. The apparatus according to claim 7, wherein the sequence of the reproduction of said plurality of frames can be arbitrarily set.

10. A film image reproducing apparatus, comprising:

a container defining an openable chamber for receiving and containing a film recorded with a formed image and recorded with data relating to said image, one frame by one frame, said container receiving said film in said chamber through an opening in said chamber, in a drop-in manner;

image reproducing means for reproducing an image of an arbitrary desired frame of said film;

reading means for reading data of said desired frame of said film;

synthesized image forming means for forming a synthesizing image from an output of said image reproducing means and from an output of said reading means;

transferring means for automatically supplying and transferring said film while said cartridge is in said chamber around a winding spool, such that the image of said desired frame is placed at a position where said image can be reproduced by said image reproducing means;

displaying means for displaying said synthesized image in a programmed sequence based on an output of said image reproducing means; and means for audibly reproducing voice data stored on said film simultaneously with reproduction and display of said synthesized image.

11. The apparatus according to claim 10, wherein said film has a magnetic recording section, and said data is recorded in said magnetic recording section.

12. The apparatus according to claim 11, further comprising printing means for printing the synthesized image based on the output of said synthesized image forming means.

13. The apparatus according to claim 12, wherein said printing means is a thermal printer of thermally sublimated coloring matter transferring type.

14. The apparatus according to claim 10, wherein said reading means has storing means for storing said read data.

15. A film image reproducing apparatus, comprising:

a container defining an openable chamber for receiving and containing a cartridge holding a developed film therein, said chamber being arranged to receive the cartridge therein through an opening in the container in a drop-in manner;

feeding means for automatically feeding said developed film from said cartridge while said cartridge is in said chamber onto a winding spool such that an image of an arbitrary desired frame is placed at a position where said image can be reproduced;

image reproducing means for reproducing an image of said arbitrary desired frame of said film;

holding means for holding said film in said cartridge again after reproducing of said image of said desired frame of said film;

displaying means for displaying said reproduced image in a programmed sequence based on an output of said image reproducing means; and means for audibly reproducing voice data stored on said film simultaneously with reproduction and display of said reproduced image.

16. The apparatus according to claim 15, wherein said film has a magnetic recording section.

17. The apparatus according to claim 16, further comprising reading means for reading data recorded in the magnetic recording section of said film, wherein said image reproducing means reproduces a synthesized image based on an output of said reading means.

18. The apparatus according to claim 17, further comprising printing means for printing the synthesized image based on the output of said image reproducing means.

19. The apparatus according to claim 18, wherein said printing means is a thermal printer of thermally sublimated coloring matter transferring type.

20. The apparatus according to claim 15, further comprising a first mode for continuously reproducing an image of one frame until a predetermined signal is inputted, and a second mode for continuously reproducing images of a plurality of frames at an interval of a predetermined time.

21. The apparatus according to claim 20, wherein said interval of said predetermined time can be arbitrarily set.

22. The apparatus according to claim 20, wherein the sequence of the reproduction of said plurality of frames can be arbitrarily set.

23. A film image reproducing apparatus, comprising:
a container defining an opening chamber for receiving and containing a cartridge holding a developed film therein, said chamber being arranged to receive the cartridge therein through an opening in the container in a drop-in manner;
designating means for designating an arbitrary desired frame of said film;
image reproducing means for reproducing the image of the arbitrary desired frame designated by said designating means;
transferring means for automatically sending said film from said cartridge onto a winding spool, while said cartridge is in said chamber, and for transferring said film to a position where the image of the arbitrary desired frame can be reproduced by said image reproducing means;
displaying means for displaying said reproduced image in a programmed sequence based on an output of said image reproducing means; and
means for audibly reproducing voice data stored on said film simultaneously with reproduction and display of said reproduced image.

24. The apparatus according to claim 23, wherein said film has a magnetic recording section.

25. The apparatus according to claim 24, further comprising reading means for reading data recorded in the magnetic recording section of said film, wherein said image reproducing means reproduces a synthesized image based on an output of said reading means.

26. A film image reproducing means, comprising:
a container defining an openable chamber for receiving and containing a cartridge holding a developed film therein, said chamber being arranged to receive the cartridge therein through an opening in the container in a drop-in manner;
image reproducing means for reproducing an image formed in an arbitrary desired frame of said film;
transferring means for automatically sending said film from said cartridge onto a winding spool, while said cartridge is in said chamber, and for transferring said film to a position where the image of the arbitrary desired frame can be reproduced by said image reproducing means;
signal outputting means for outputting an output signal of said image reproducing means to a unit external of said film image reproducing means;
displaying means for displaying said reproduced image in a programmed sequence based on an output of said image reproducing means; and
means for audibly reproducing voice data stored on said film simultaneously with reproduction and display of said reproduced image.

27. The apparatus according to claim 26, wherein said film has a magnetic recording section.

28. The apparatus according to claim 27, further comprising reading means for reading data recorded in the magnetic recording section of said film, wherein said image reproducing means reproduces a synthesized image based on an output of said reading means.

29. The apparatus according to claim 26, wherein said signal outputting means is connectable to a printing apparatus for printing a reproduced image.

30. A film image reproducing apparatus, comprising:
a container defining an openable chamber for receiving and containing a cartridge holding a developed film therein, said chamber being arranged to receive the cartridge therein through an opening in the container in a drop-in manner;
image signal converting means for converting an image formed in an arbitrary desired frame of said film to an image signal;
transferring means for automatically sending said film from said cartridge onto a winding spool, while said cartridge is in said chamber, and for transferring said film to a position where the image of said arbitrary desired frame can be reproduced by said image signal converting means;
reversing means for reversing an output of said image signal converting means from a negative state to a positive state;
switching means for switching said reversing means to an operating state or a non-operating state;
displaying means for displaying said converted image in a programmed sequence based on an output of said image signal converting means; and
means for audibly reproducing voice data stored on said film simultaneously with conversion and display of said converted image.

31. The apparatus according to claim 30, wherein said film has a magnetic recording portion.

32. The apparatus according to claim 31, further comprising reading means for reading data recorded in the magnetic recording section of said film, wherein said image reproducing means reproduces a synthesized image based on an output of said reading means.

33. An image reproducing apparatus, comprising:
first containing means defining an openable chamber for receiving and containing a film cartridge holding a developed film therein, said chamber being arranged to receive the cartridge therein through an opening in the container in a drop-in manner;
drawing means for automatically drawing said film out from said film cartridge while said film cartridge is in said chamber of said first containing means, onto a winding spool, such that an arbitrary desired frame is presented for reproduction;
second containing means for receiving and containing the film drawn out from said first containing means, said second containing means including said winding spool;
radiating means radiating light to a surface of the drawn out film transferred from said first containing means to said second containing means;
an optical system for passing light sent from said radiating means through said film;
light receiving means for receiving light passed through said optical system and a formed image on said film surface;
displaying means for displaying the formed image received by said light receiving means in a programmed sequence; and means for audibly reproducing voice data stored on said film simultaneously with formation of said image.

34. The apparatus according to claim 33, wherein said second containing means is formed of winding means for winding the film automatically sent from said cartridge case.

35. The apparatus according to claim 33, wherein said film has magnetic recording means, and said displaying means displays data recorded in said magnetic recording means.

36. The apparatus according to claim 33, wherein said displaying means is printing means for printing the formed image on a paper surface.

37. The apparatus according to claim 33, wherein said cartridge case contains the film at the time of forming an image.

38. The apparatus according to claim 34, wherein said cartridge case contains the film after developing treatment.

39. An image reproducing apparatus, comprising:
- a container defining an openable chamber for receiving and containing a cartridge holding a developed film therein, said chamber being arranged to receive the cartridge therein through an opening in the container in a drop-in manner;
- drawing means automatically drawing a developed film out from the film cartridge while said film cartridge is in said chamber of said container, onto a winding spool, such that an arbitrary desired frame is presented for reproduction;
- radiating means for radiating light on a surface of said drawn film;
- an optical system for passing light sent from said radiating means through said film;
- light receiving means for receiving light passed through said optical system and for thereby received a formed image on said film surface;
- displaying means for displaying the formed image received by said light receiving means in a programmed sequence; and
- means for audibly reproducing voice data stored on said film simultaneously with formation of said image.

40. The apparatus according to claim 39, wherein said film has magnetic recording means, and said displaying means displays data recorded in said magnetic recording means.

41. The apparatus according to claim 39, wherein said displaying means is printing means for printing the formed image on a paper surface.

42. The apparatus according to claim 39, wherein said displaying means displays the formed image on a monitor.

43. An image reproducing apparatus, comprising:
- a container defining an openable chamber for receiving and containing a cartridge holding a developed film therein, said chamber being arranged to receive the cartridge therein through an opening in the container in a drop-in manner;
- drawing means for drawing a developed film out from the film cartridge while said film cartridge is in said chamber of said container;
- winding means for automatically winding up the drawn out film onto a winding spool, such that a arbitrary desired frame is presented for reproduction;
- radiating means for radiating light on a surface of said drawn out film;
- an optical system for passing light sent from said radiating means through said film;
- photoelectric converting means for receiving light passed through said optical system and a formed image on the surface of said film so as to convert said formed image to an electric signal;
- displaying means for displaying said formed image in a programmed sequence based on an output of said photoelectric converting means; and
- means for audibly reproducing voice data stored on said film simultaneously with formation of said image.

44. The apparatus according to claim 43, wherein said displaying means displays the formed image on a monitor.

45. The apparatus according to claim 43, wherein said displaying means is printing means for printing the formed image on a paper surface.

46. The apparatus according to claim 43, wherein said photoelectric converting means is a charge coupled device (CCD).

47. An image reproducing apparatus, comprising:
- first containing means defining an openable chamber for receiving and containing a film cartridge holding a developed film therein, said chamber being arranged to receive the cartridge therein through an opening in the container in a drop-in manner;
- drawing means for automatically drawing a developed film out from the film cartridge while said film cartridge is in said chamber of said container, onto a winding spool, such that an arbitrary desired frame is presented for reproduction;
- second containing means for receiving and containing the drawn out film, said second containing means including said winding spool;
- radiating means for radiating light to a surface of a drawn out film transferred from said first containing means to said second containing means;
- an optical system for passing light sent from said radiating means through said film;
- photoelectric converting means for receiving light passed through said optical system and a formed image on the surface of said film so as to convert said formed image to an electric signal;
- displaying means for displaying said formed image in a programmed sequence based on an output of said photoelectric converting means; and
- means for audibly reproducing voice data stored on said film simultaneously with formation of said image.

48. The apparatus according to claim 47, wherein said displaying means displays the formed image on a monitor.

49. The apparatus according to claim 47, wherein said displaying means is printing means for printing the formed image on a paper surface.

50. The apparatus according to claim 47, wherein said photoelectric converting means is a charge coupled device (CCD).

51. An image reproducing apparatus, comprising:
- a container defining an openable chamber for receiving and containing a cartridge holding a developed film therein, said chamber being arranged to receive the cartridge therein through an opening in the container in a drop-in manner;
- drawing means for automatically drawing a top end of a developed film out from a film cartridge which contains said film in a wound state;
- winding means for automatically winding said film drawn by said drawing means around a winding spool, such that an arbitrary desired frame is presented for reproduction;

an illumination light source arranged at a rear surface of said drawn out film;

an optical system arranged at a front source of said drawn out film;

photoelectric converting means for receiving a formed image on the surface of said film guided by said optical system so as to photoelectrically convert said formed image;

displaying means for displaying said formed image, which was photoelectrically converted, on the surface of said film, in a programmed sequence based on an output of said photoelectric converting means, one frame by one frame or continuously; and means for audibly reproducing voice data stored on said film simultaneously with formation of said image.

52. The apparatus according to claim 51, wherein said film has magnetic recording means, and said displaying means displays data recorded in said magnetic recording means.

53. The apparatus according to claim 51, wherein said displaying means is printing means for printing the formed image on a paper surface.

54. An image reproducing apparatus, comprising:

a container defining an openable chamber for receiving and containing a cartridge holding a developed film therein, said chamber being arranged to receive the cartridge therein through an opening in the container in a drop-in manner;

drawing means for automatically drawing out a developed film from the film cartridge case containing said film while said film cartridge is in said chamber of said container, onto a winding spool, such that an arbitrary desired frame is presented for reproduction;

radiating means for radiating light on a surface of said drawn out film;

light receiving means for receiving an image on said film radiated by said radiating means, as a formed image;

displaying means for displaying the formed image received by said light receiving means in a programmed sequence; and means for audibly reproducing voice data stored on said film simultaneously with formation of said image.

55. An image reproducing apparatus, comprising:

a container defining an openable chamber for receiving and containing a cartridge holding a developed film therein, said chamber being arranged to receive the cartridge therein through an opening in the container in a drop-in manner;

frame position detecting means for detecting a position of a frame of said film in which an image formation is finished;

film transferring means for automatically transferring said film from the film cartridge contained in said chamber onto a winding spool, and stopping the film transfer based on an output of said frame position detecting means to an arbitrary desired frame;

projecting means for projecting light on said film while said film is stopped by said film transferring means;

photoelectric converting means for converting a projection image of said film projected by said projecting means to an electric signal;

a shutter, provided between said film to be transferred and said photoelectric converting means and which is openable and closable, for shielding light directed to said photoelectric converting means from the surface of said film, when said shutter is in a closed state;

image reproducing means for reproducing a synthesized image from an output of said photoelectric converting means;

displaying means for displaying said synthesized image in a programmed sequence based on an output of said image reproducing means; and means for audibly reproducing voice data stored on said film simultaneously with reproduction and display of said synthesized image.

56. The apparatus according to claim 55, wherein said shutter is closed while the film is transferring, and opened when the transfer of the film is stopped.

57. The apparatus according to claim 55, wherein said shutter is opened/closed by a driving source.

58. The apparatus according to claim 57, further comprising controlling means for controlling said shutter through said driving source.

59. The apparatus according to claim 11, wherein said magnetic recording section of said film stores said voice data thereon.

60. The apparatus according to claim 16, wherein said magnetic recording section of said film stores said voice data thereon.

61. The apparatus according to claim 24, wherein said magnetic recording section of said film stores said voice data thereon.

62. The apparatus according to claim 27, wherein said magnetic recording section of said film stores said voice data thereon.

63. The apparatus according to claim 31, wherein said magnetic recording section of said film stores said voice data thereon.

64. The apparatus according to claim 35, wherein said magnetic recording means of said film stores said voice data thereon.

65. The apparatus according to claim 40, wherein said magnetic recording means of said film stores said voice data thereon.

66. The apparatus according to claim 52, wherein said magnetic recording means of said film stores said voice data thereon.

67. The apparatus according to claim 43, wherein said film has a magnetic recording section.

68. The apparatus according to claim 47, wherein said film has a magnetic recording section.

69. The apparatus according to claim 54, wherein said film has a magnetic recording section.

70. The apparatus according to claim 55, wherein said film has a magnetic recording section.

71. An apparatus according to claim 1, wherein said film transferring means includes a rewinding device for rewinding the film to said arbitrary desired frame for reproduction thereof.

72. An apparatus according to claim 10, wherein said transferring means includes a rewinding device for rewinding the film to said arbitrary desired frame for reproduction thereof.

73. An apparatus according to claim 15, wherein said feeding means includes a rewinding device for rewinding the film to said arbitrary desired frame for reproduction thereof.

74. An apparatus according to claim 23, wherein said transferring means includes a rewinding device for rewinding the film to said arbitrary desired frame for reproduction thereof.

75. An apparatus according to claim 26, wherein said transferring means includes a rewinding device for rewinding the film to said arbitrary desired frame for reproduction thereof.

76. An apparatus according to claim 30, wherein said transferring means includes a rewinding device for rewinding the film to said arbitrary desired frame for reproduction thereof.

77. An apparatus according to claim 33, further including a rewinding device for rewinding the film to said arbitrary desired frame for reproduction thereof.

78. An apparatus according to claim 39, further including a rewinding device for rewinding the film to said arbitrary desired frame for reproduction thereof.

79. An apparatus according to claim 43, further including a rewinding device for rewinding the film to said arbitrary desired frame for reproduction thereof.

80. An apparatus according to claim 47, further including a rewinding device for rewinding the film to said arbitrary desired frame for reproduction thereof.

81. An apparatus according to claim 1, further including a rewinding device for rewinding the film to said arbitrary desired frame for reproduction thereof.

82. An apparatus according to claim 54, further including a rewinding device for rewinding the film to said arbitrary desired frame for reproduction thereof.

83. An apparatus according to claim 55, wherein said film transferring means includes a rewinding device for rewinding the film to said arbitrary desired frame for reproduction thereof.

* * * * *